United States Patent
Putzer et al.

[11] 3,841,822
[45] Oct. 15, 1974

[54] SEAMLESS ARTICLE MOLDING APPARATUS

[75] Inventors: Raymond M. Putzer, Racine; William J. Maurino, Kenosha, both of Wis.

[73] Assignee: Precision Flexmold Inc., Racine, Wis.

[22] Filed: Oct. 3, 1973

[21] Appl. No.: 403,196

Related U.S. Application Data

[62] Division of Ser. No. 222,141, Jan. 31, 1972, Pat. No. 3,776,683.

[52] U.S. Cl. .................................. 425/440, 249/66
[51] Int. Cl. .............................................. B28b 7/06
[58] Field of Search ............ 249/70, 127, 134, 183, 249/66 A, 66 C, 66 R, 179; 425/DIG. 44, DIG. 48, 383, 385, 436, 437, DIG. 50, DIG. 58, DIG. 124; 264/DIG. 50, 313, 314, 315, 316, 318, 319, 334, 335, 336

[56] References Cited
UNITED STATES PATENTS

| | | | |
|---|---|---|---|
| 2,345,206 | 3/1944 | Mallard | 249/127 X |
| 2,373,251 | 4/1945 | Mallard | 249/127 X |
| 2,462,940 | 3/1949 | Bowes | 264/316 X |
| 3,118,960 | 1/1964 | Cook | 264/313 X |
| 3,576,930 | 4/1971 | Watters | 264/316 X |
| 3,642,965 | 2/1972 | Nuttall | 264/DIG. 50 |

*Primary Examiner*—J. Spencer Overholser
*Assistant Examiner*—John S. Brown
*Attorney, Agent, or Firm*—James E. Nilles

[57] ABSTRACT

Molding apparatus for molding articles without a seam or parting line even though the articles may have severe backdraft portions. The apparatus includes a one-piece flexible mold of relatively thick and self-supporting wall construction which is deformable by the application of fluid pressure differential to thereby release the finished article from the mold. One modification of the one-piece mold also has a thick radially extending flange which forms a seal with a vacuum pot when the mold is simply set in the pot.

2 Claims, 17 Drawing Figures

SEAMLESS ARTICLE MOLDING APPARATUS

REFERENCE TO A CO-PENDING RELATED APPLICATION

This application is a divisional application of the co-pending U.S. Ser. No. 222,141, filed Jan. 31, 1972, entitled "Apparatus for Molding Articles", which issued as U.S. Pat. No. 3,776,683 on Dec. 4, 1973.

BACKGROUND OF THE INVENTION

The invention pertains to molding devices of the type utilizing a one-piece and generally hollow, distensible and flexible mold which has an interior configuration corresponding to that of the finished product. Fluid pressure differential is caused to act on the flexible mold to expand it, consequently causing its separation from the finished article, and thereby permit the article to be removed from the mold, notwithstanding the backdraft or undercut portions.

An example of a prior art device of this general character is shown in the U.S. Pat. 2,124,871, issued July 26, 1938 to Beal and entitled "Method and Apparatus for Molding Articles". The Beal apparatus was severely limited as to the articles which could be made with it. More specifically, the said Beal patent advocated the use of a very thin flexible matrix which distorts when filled with fluid material, thereby resulting in distortion and unfaithful reproduction of the pattern. Furthermore, the said patent utilized a matrix in which it was necessary to clamp the flange to the vacuum pot to effect the necessary seal and this shortcoming severely limited the production. Other prior devices required laborious and time consuming set-up and disassemble operations. Furthermore the filling of the mold with fluid material was awkward and difficult.

SUMMARY OF THE INVENTION

The present invention provides apparatus for molding seamless articles and comprises a generally hollow, one-piece, distensible, flexible mold having a side wall of sufficient thickness whereby it is self-supporting and supports the weight of the material poured therein without distortion of the mold. Means are provided for applying differential pressure on the mold to thereby cause the mold to distend or expand and separate from the finished article therein. The thick-walled mold is only expanded sufficiently to be able to withdraw the article, thereby contributing to good life of the mold.

Another aspect of the invention relates to apparatus of the type in which the flexible mold has a thick and self-supporting, radially extending annular flange which forms a seal with a vacuum pot in which the mold is located. The arrangement is such that the pot and the mold form an annular chamber from which a vacuum is drawn to thereby distend and expand the mold into the chamber, while at the same time, the flange cooperates with the edge of the pot to maintain the seal as the mold is generally retracted from the article. As a result, there is no need to attach the mold to the vacuum pot, but it is only necessary to simply seat the mold on the pot and apply the vacuum, the pot and mold automatically forming a seal therebetween which performs its sealing function regardless of movement of the mold flange relative to the pot.

Another aspect of the invention relates to a mold of the above type in which an upper surface thereof is generally flat and unobstructed, thereby greatly facilitating loading of the mold with fluid material and striking the excess therefrom.

With the above construction precisely formed articles are produced in a very rapid manner and with considerable economy over the prior art.

With the apparatus provided by the present invention, the mold is self-supporting and accurately reproduces the article to be made, clamping apparatus for the mold is unnecessary, loading of the mold is greatly facilitated as is the cleaning thereof, and the same vacuum pot can be used for many different molds.

DESCRIPTION OF A PREFERRED EMBODIMENT

Figure 1:
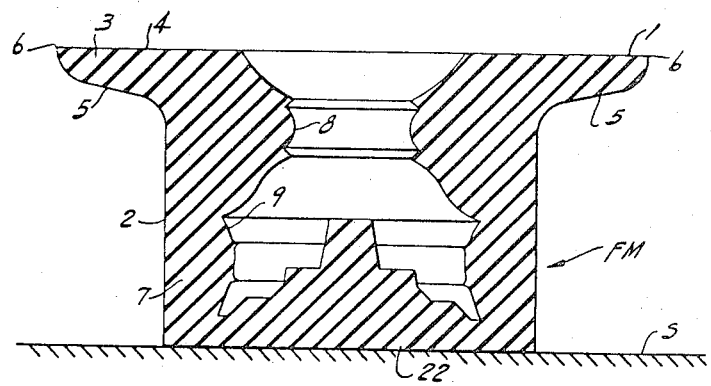
FIG. 1 is a vertical cross-sectional view of a mold made in accordance with the present invention.
Figure 2:
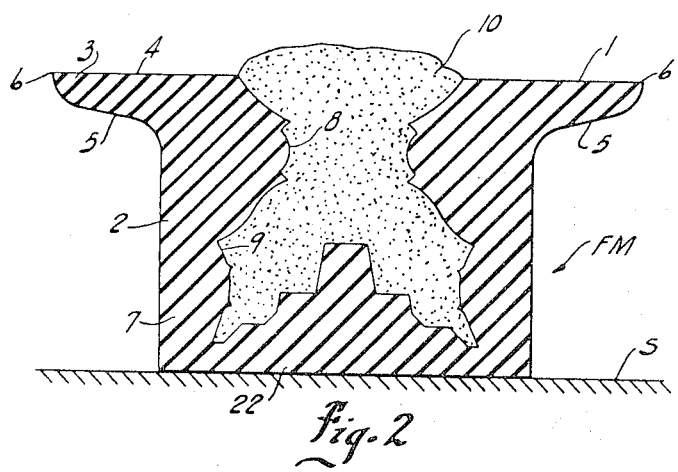
FIG. 2 is a view of the mold shown in FIG. 1, but when initially filled with fluid material which will subsequently harden.
Figure 3:
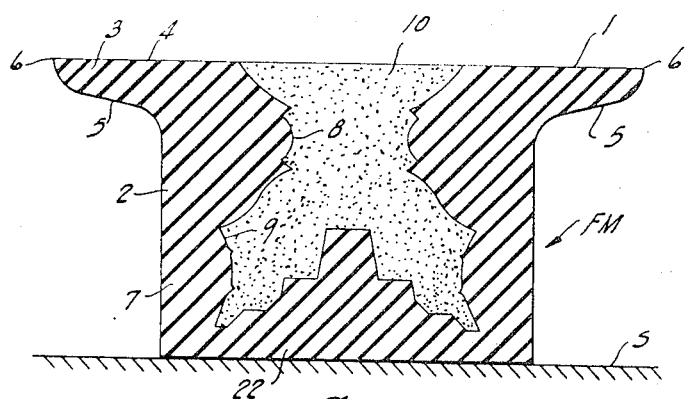
FIG. 3 is a view similar to FIG. 2, but showing the excess material struck off the flush with the top surface of the mold.

Generally, the present invention is concerned with production of articles, particularly those having considerable back draft or undercut portions and which articles are formed of hardenable material in flexible molds. Various types of hardenable material may be used with the present invention, and include but are not limited to plaster, cement, resins, parafin, or other materials.

The flexible material utilized with the present invention may be of various types having elastomeric properites and include, but are not limited to polyvinyl chloride "Korogel" produced by B.F.Goodrich of Akron, Ohio; polysulphide cold molding compounds sold by Perma Flex of Columbus, Ohio; and the silastic RTV silicone rubber produced by Dow Corning and General Electric. However, the polysulphide synthetic rubber material sometime known as "Blak-Stretchy", has been found to be particularly advantageous in the present invention wherein a relatively thick and selfsupporting wall of considerable varying thickness is utilized, and is particularly dimensionally stable.

The invention has been shown in FIGS. 1 to 8 as including a generally hollow, one-piece distensible flexible mold FM. This mold has a main, generally cylindrical portion 2, adjacent the upper end of which is an integrally formed and relatively thick and self-supporting, radially extending annular flange 3. It will be noted that the upper surface 4 of the mold is generally flat, smooth and unobstructed. The lower surface of the flange is formed as an upwardly extending curved surface 5 which tapers generally to a narrow, annular edge 6. Side wall 7 of the mold is of a width which varies considerably throughout its height, and defines a cavity 8 in the mold which has, for example, considerable backdraft portion 9.

The thickness of the wall 7 is such that it is self-supporting and can rest on a flat surface S to support the weight of the fluid material 10 which is poured into the mold to fill the cavity, without distortion of the mold.

Figure 4:
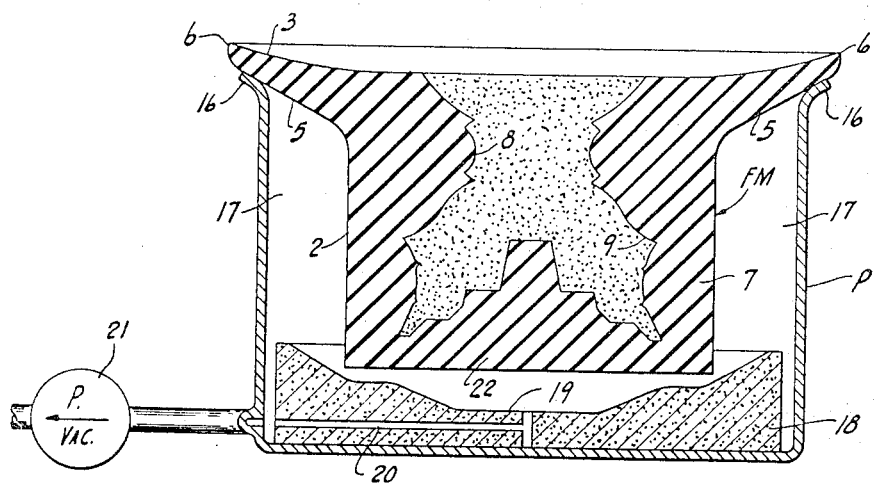
FIG. 4 shows the filled mold of FIG. 3 when inserted in a vacuum pot and prior to the application of vacuum, and showing material in the pot which controls and directs the amount of mold distortion.

The flexible mold FM as shown in the FIG. 4 arrangement is inserted in a vacuum pot P and which pot includes a generally outwardly flared flange 16 on which the mold and more particularly, the curved surface 5 of the flange 3 rests in sealing relationship. Thus, the mold and the pot form an annular sealed chamber 17 therebetween.

In the bottom of the pot is located a material 18 which forms a pit 19 of a particular shape depending on the shape of the article to be formed.

As previously mentioned, it is desirable to limit, control and direct the amount of mold distention to only that required to permit removal of the article. The material 18 serves to so limit the amount of distention of the mold when vacuum is applied to the chamber 17. The vacuum is formed by means of passageway 20 leading into the chamber 17 from a conventional vacuum pump 21.

Figure 5:
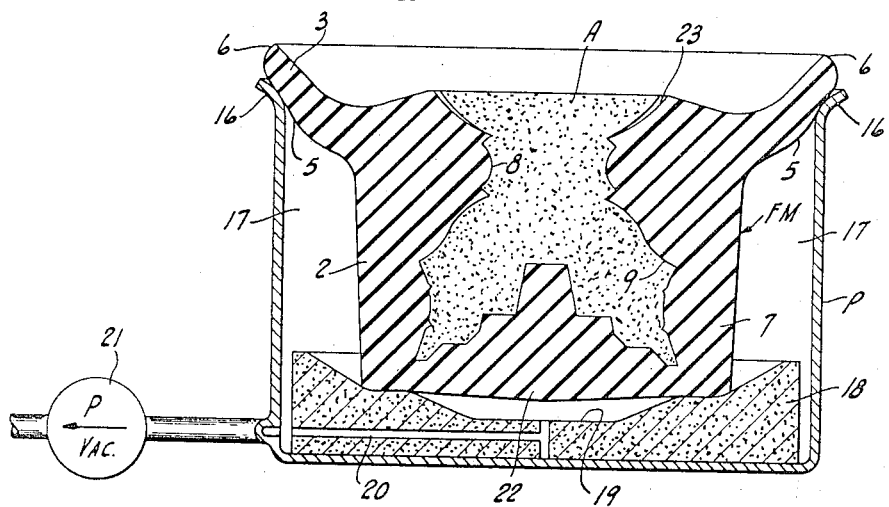
FIG. 5 shows the arrangement in FIG. 4 when a certain amount of vacuum has been applied.

As shown in FIG. 5, a certain amount of vacuum has been applied so as to pull the mold downwardly where its bottom 22 rests on the material 18. It will be noted that at this stage the mold has separated from the upper portion of the article A and the flange 3 of the mold has deformed and slid down or rolled along the inclined or flared flange 16 of the vacuum pot. Stated otherwise, the flange 3 pivots and/or shifts on the edge of the pot to induce a separation 23 (FIG. 5) between the upper end of the rigid article A and the mold. The separation then continues until the mold inner surface is exposed to atmospheric pressure.

In this manner, a rounded smooth engagement is provided for the underside of the flange 3 and the pot edge 16 whereby, when the vacuum is applied to the pot, the mold is drawn downwardly into the pot and the flange 3 is pulled against the edge tightly and in continuous sealing engagement. It should be noted that the flange is not pulled fully into the pot. There is no need to clamp or otherwise fix the wall to the pot but it is only necessary to seat the filled mold on the flange of the pot.

Figure 6:
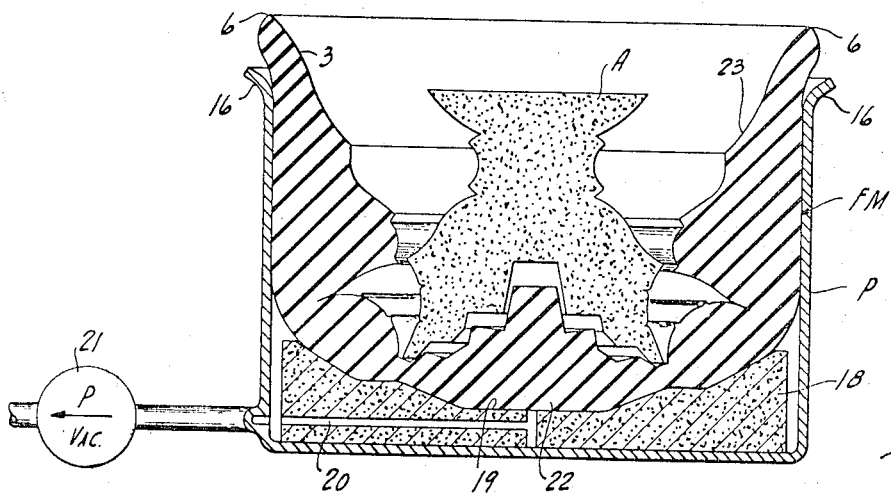
FIG. 6 shows the arrangement of FIG. 5, but with the mold in the fully distended, article releasing position.

FIG. 6 shows the mold when the vacuum has been fully applied to thereby additionally distend the mold only sufficiently to free the article A for easy removal from the mold, notwithstanding severe backdraft portions.

Figure 7:
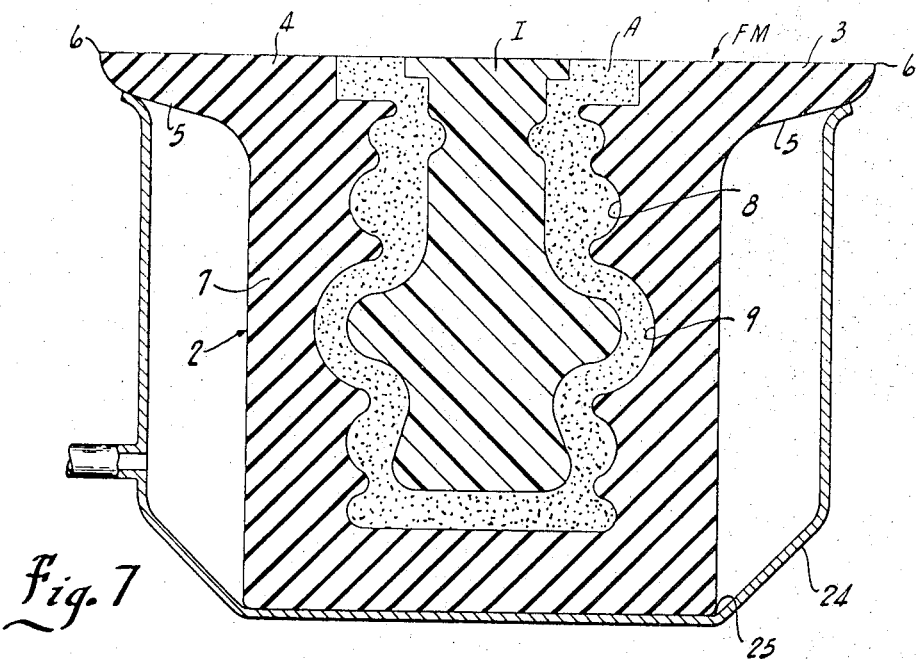
FIG. 7 is a view similar to FIG. 5, but showing a mold resting on the bottom of the vacuum pot, and without the use of mold confining material, and also showing a metal insert which had been placed in the mold.
Figure 8:
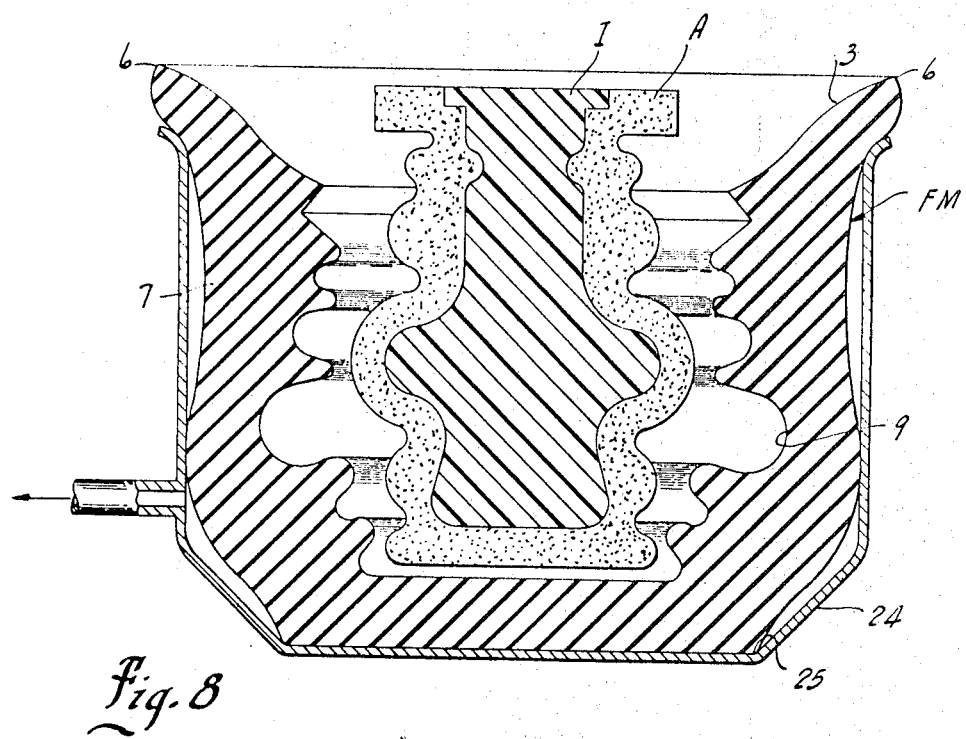
FIG. 8 is a view similar to FIG. 7, but showing the arrangement when vacuum is applied to distend the mold and free the article therein.

FIGS. 7 and 8

FIGS. 7 and 8 show a generally similar arrangement with the exception that the bottom of the mold rests directly on the bottom of the pot. The pot has a flared portion 24 which defines a shoulder 25 that limits the radial distortion of the bottom part of the mold to thereby effect a limited and orderly radial retraction of the lower portion of the mold, as shown in FIG. 8. Thus, vacuum is applied so as to generally distend the mold in a radially outward direction, and the flange 3 is pulled slightly downwardly, but not fully into the pot, in sliding, sealing relationship with the upper edge of the pot.

Depending on the shape of the article to be made, it may be unnecessary to use any distortion limiting means. The FIGS. 7 and 8 modification shows the use of an insert I which forms a part of the finished article. The hardenable material 10 is poured between the mold FM and the insert I.

FIGS. 9–12

Figure 12:
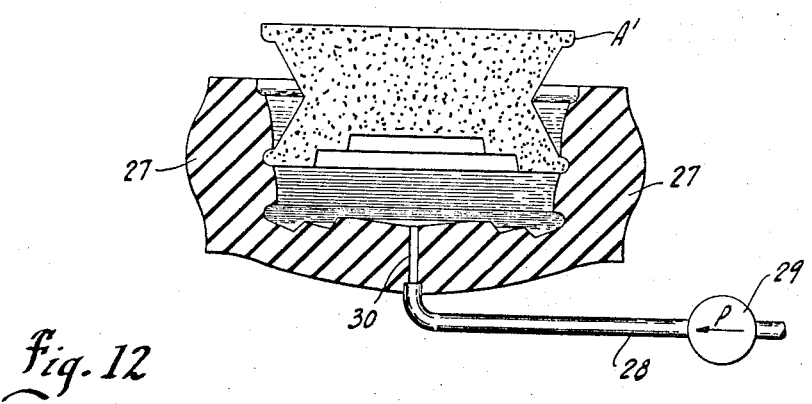
FIG. 12 shows the arrangement of FIG. 11, but when air pressure has been introduced between the mold and the hardened finished article to cause distention of the mold and partial removal of the aritcle.

The modification shown in FIGS. 9 to 12 is used for articles where the degree of backdraft, is less severe. With this modification air pressure is introduced between the finished article A' and the flexible mold FM' to thereby again distend the flexible mold in a generally radial direction. This air pressure also may act to actually shift or move the article A, at least to some extent, outwardly of its mold, as shown in FIG. 12.

More specifically, the flexible mold FM' also has thick side walls 27 which are self-supporting and consequently the mold does not distort when filled with the hardenable material. The air pressure is introduced via conduit 28 from a pressure pump 29 and through the passage 30 in the bottom of the mold. The passage 30 may be formed by piercing the bottom of the mold with a hot needle and the compressed air, for example at 90 p.s.i., is introduced into the passage 30. The bottom of the mold expands sufficiently to allow the article to be removed from the mold.

Figure 9:
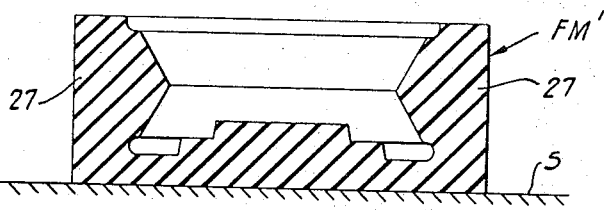
FIG. 9 is a cross-sectional view of a modification of the mold made in accordance with the present invention.
Figure 10:
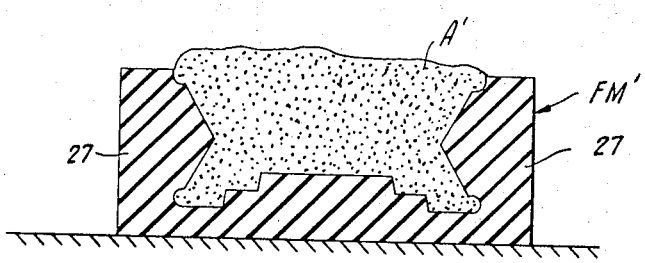
FIG. 10 shows the mold of FIG. 9 when the mold is initially being filled with unhardened material.
Figure 11:
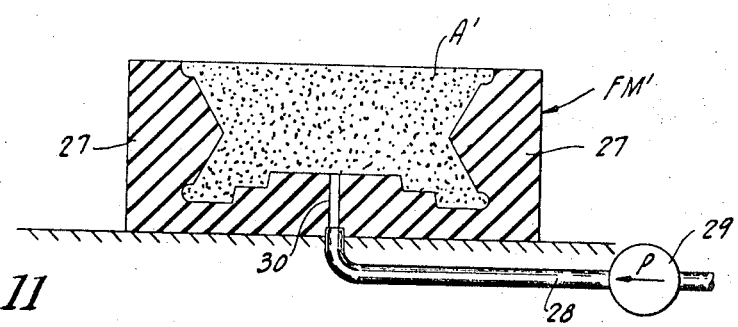
FIG. 11 is a view similar to FIG. 10, but when the excess material has been struck off flush with the top of the mold.

Thus, the FIG. 9 device also provides a generally hollow, one piece distensible flexible mold having a side wall of sufficient thickness so that it is self-supporting and supports the weight of the material poured therein without distortion of the mold. The means for applying differential pressure in this embodiment is the pressure pump 29 which introduces air under pressure to the juncture between the article and the inner face of the mold. The mold wall is of widely varying thickness, and forms backdraft portions in the mold.

FIGS. 13–15

Figure 13:
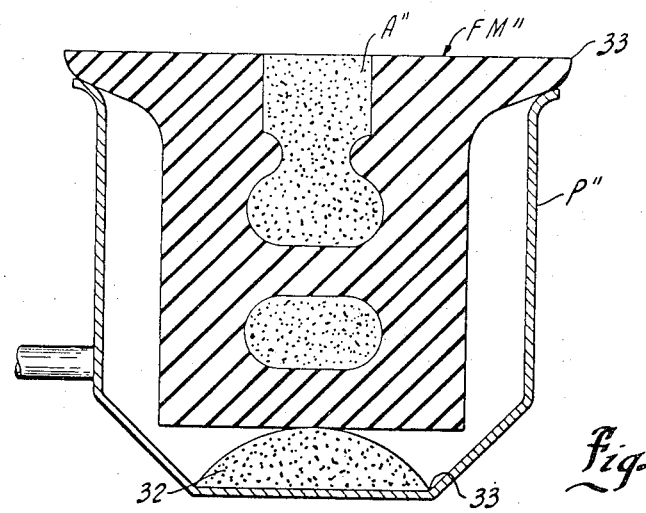
FIG. 13 is a vertical cross-sectional view of still another mold made in accordance with the present invention and showing the hardened material therein.
Figure 14:
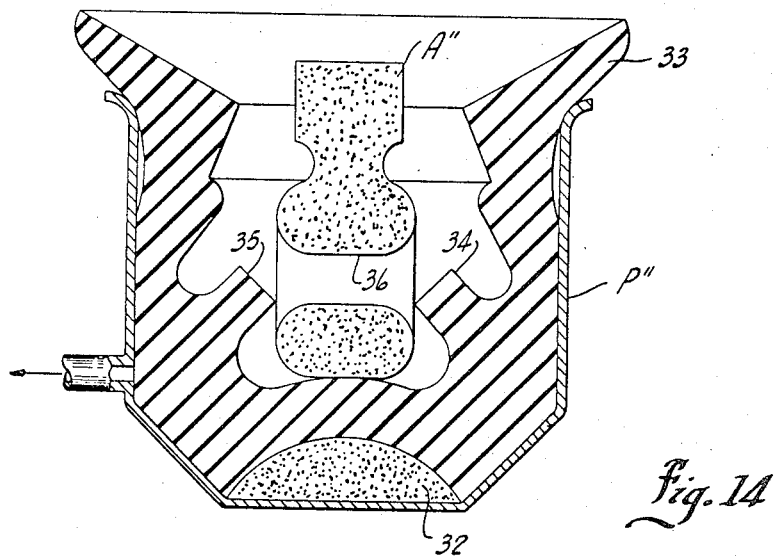
FIG. 14 is a view similar to FIG. 13, but showing the mold as distended when vacuum is applied thereto.
Figure 15:
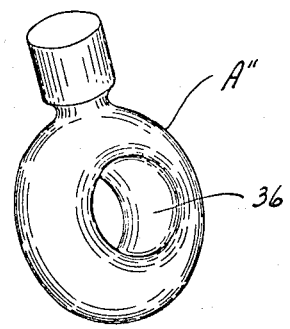
FIG. 15 is a perspective view of the article made by the mold shown in FIG. 13.

The modification shown in FIGS. 13 to 15 is for use where internal apertures or the like are to be formed in the article. This apparatus includes a flexible mold FM'' having a radially extending, annular flange 33 similar in construction to the flange shown in FIG. 1, and the mold is also used in a circular pot P'' such as shown in FIG. 7, together with a material 32 in the bottom of the pot. This material 32, together with the shoulder 33 formed in the pot bottom, act to cause the mold to distort generally outwardly and downwardly, as shown in FIG. 14. Thus, when vacuum is applied to the pot, the mold FM'' extends generally radially, thereby withdrawing the central portions 34 and 35 of the mold in opposite directions from one another to clear the aperture 36 (FIG. 15) formed in the article A''. In other words, the flexible mold FM'' is deformed sufficiently by means of the present invention so as to completely withdraw the mold inner members 34, 35 from the article and thereby providing an article with an interior aperture.

FIGS. 16–17

Figure 16:
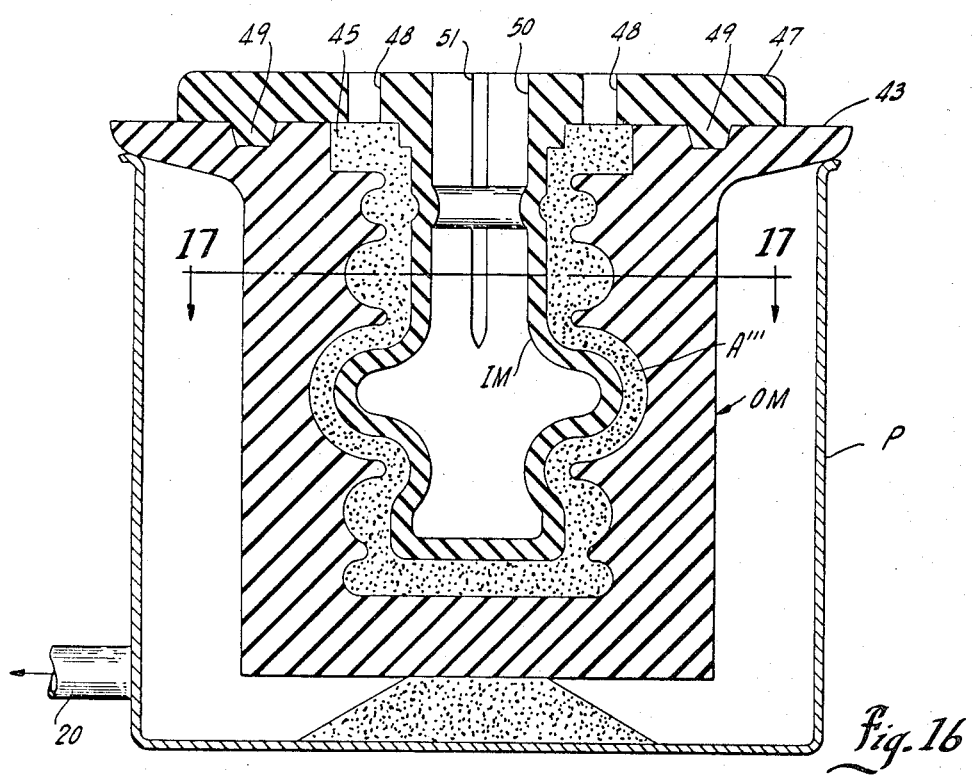
FIG. 16 is a vertical, cross-sectional view of still another modification of molds made in accordance with the present invention and specifically showing a male and female mold arrangement.
Figure 17:
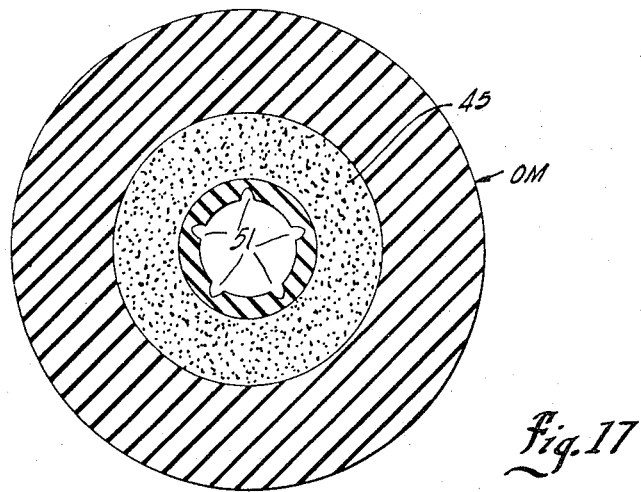
FIG. 17 is a sectional view taken along line 17—17 of FIG. 16.

The FIG. 16 arrangement is of the male and female type and includes an outer mold OM having a flange 43 similar in construction and operation to the flange 3 shown and described in connection with FIG. 1. In addition to the outer mold OM, an inner flexible mold IM is provided and is of sufficient wall thickness so as to prevent distortion when the fluid material is poured into the annular space 45 between the inner and outer molds. More specifically, the inner mold IM has a radially extending flange 47 containing filling apertures 48 through which the fluid material is poured into the space 45. Inter-engaging key means 49 may be provided between the flange 43 of the outer mold and the flange 47 of the inner mold, to circumferentially locate the molds relative to one another. After the material has hardened in space 45 to thereby precisely form the article A''', vacuum is applied to conduit 20 of the pot P, as described in connection with FIG. 1. Vacuum is also applied to the passage 50 in the inner mold IM, causing the latter to collapse inwardly where it can be withdrawn from the interior of the article A'''. In order to insure the orderly collapse of the inner mold in a generally even manner around its circumference, a series of recesses 51 are formed along the interior length of the inner mold. This construction causes the inner mold to retract all around its circumference rather than simply be flattened which would prevent withdrawing the inner mold from the finished article.

RESUME

The apparatus provided by the present invention is capable of providing articles having severe undercut portions and with no seams. Such articles may be produced in an expeditious and economical manner due to the fact that the self-supporting molds may be poured full of hardenable material, the top struck off quickly with excess material and the filled molds then permitted to harden. After the article has hardened, it is only necessary to apply differential pressure to the mold, thereby causing it to expand, and free the article for easy removal.

One embodiment of the invention utilizes a thick flange which forms a continuous seal with the top of the vacuum pot and there is no need to fasten the flange in any manner to the pot. Instead, the filled mold is simply set on the pot and the vacuum applied. As the mold is retracted from the article, the mold is retracted and drawn downwardly somewhat into the pot causing the mold flange to roll or pivot on the vessel top edge and simultaneously permitting the mold to be peeled away from the article in an orderly progression.

The thick walled mold is not expanded or withdrawn from the article any further than is necessary to free the mold and this permits the use of a thick wall mold and further contributes to long life of the mold.

We claim:

1. Apparatus for molding seamless articles comprising a generally hollow, one-piece elastomeric flexible mold having a side wall of sufficient thickness that it is self-supporting and supports the weight of the material when being poured therein without distortion of said mold, said mold side wall being of varying thickness thereby forming undercut back draft portions in said mold, means for injecting air pressure between said mold and the article therein to thereby cause expansion of said mold and permit removal of the article from the mold.

2. The apparatus set forth in claim 1 including a bottom wall connected to said side wall, and said means for injecting air pressure is located in said bottom wall.

* * * * *